(12) United States Patent
Kato

(10) Patent No.: US 10,532,779 B2
(45) Date of Patent: Jan. 14, 2020

(54) VEHICLE REAR STRUCTURE

(71) Applicant: TOYOTA JIDOSHA KABUSHIKI KAISHA, Toyota-shi (JP)

(72) Inventor: Hiroyuki Kato, Nisshin (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 15/822,874

(22) Filed: Nov. 27, 2017

(65) Prior Publication Data
US 2018/0170454 A1 Jun. 21, 2018

(30) Foreign Application Priority Data
Dec. 16, 2016 (JP) ................ 2016-244467

(51) Int. Cl.
*B62D 33/04* (2006.01)
*B62D 27/02* (2006.01)
*B62D 25/08* (2006.01)
*B60R 5/04* (2006.01)
*B60R 11/00* (2006.01)
*B60R 13/02* (2006.01)

(52) U.S. Cl.
CPC ............ *B62D 33/04* (2013.01); *B60R 5/044* (2013.01); *B60R 13/0268* (2013.01); *B62D 25/087* (2013.01); *B62D 27/023* (2013.01); *B60R 2011/0024* (2013.01)

(58) Field of Classification Search
CPC .... B62D 25/087; B62D 25/088; B62D 21/03; B62D 33/04; B62D 27/023; B60R 5/044; B60R 13/011; B60R 13/0268; B60R 2011/0024

USPC ............... 296/24.44, 193.02, 193.08, 203.04
See application file for complete search history.

(56) References Cited

U.S. PATENT DOCUMENTS

| 4,351,559 | A | * | 9/1982 | Sugisawa | ................ | B60J 10/70 |
| | | | | | | 296/201 |
| 6,196,622 | B1 | * | 3/2001 | Brodt | ................... | B62D 25/087 |
| | | | | | | 296/203.04 |
| 6,808,228 | B1 | * | 10/2004 | Campbell | ............ | B62D 25/087 |
| | | | | | | 296/187.11 |
| 7,325,865 | B2 | * | 2/2008 | Yamazaki | ............ | B62D 21/152 |
| | | | | | | 296/193.02 |
| 8,184,847 | B2 | * | 5/2012 | Bertoli | ................... | H04R 1/025 |
| | | | | | | 296/186.3 |
| 2008/0279412 | A1 | | 11/2008 | Bertoli et al. | | |

(Continued)

FOREIGN PATENT DOCUMENTS

| JP | 62-8882 U | 1/1987 |
| JP | 11-78984 | 3/1999 |

(Continued)

*Primary Examiner* — Gregory A Blankenship
(74) *Attorney, Agent, or Firm* — Oblon, McClelland, Maier & Neustadt, L.L.P.

(57) ABSTRACT

A vehicle rear structure has an upper back panel, and a first closed sectional part that is coupled to a front end part of the upper back panel in a vehicle forward-rearward direction and serves as a closed sectional part having a closed section structure. The first closed sectional part is constituted of a first panel and a second panel that are panel members different from the upper back panel. The thickness of the first panel and the thickness of the second panel are larger than the thickness of the upper back panel, respectively.

4 Claims, 4 Drawing Sheets

(56) References Cited

U.S. PATENT DOCUMENTS

| | | | | |
|---|---|---|---|---|
| 2012/0049557 A1* | 3/2012 | Sakai | ................. | B62D 25/02 |
| | | | | 296/24.4 |
| 2013/0277130 A1* | 10/2013 | Katou | ................. | B60K 1/04 |
| | | | | 180/68.5 |
| 2014/0152054 A1* | 6/2014 | Yano | ................. | B62D 25/087 |
| | | | | 296/193.08 |
| 2015/0284033 A1* | 10/2015 | Yamamoto | ............ | B62D 25/16 |
| | | | | 296/193.05 |
| 2017/0210306 A1* | 7/2017 | Tavakoli Targhi | ........................ | |
| | | | | B60R 13/0268 |
| 2017/0369103 A1* | 12/2017 | Khayat | ................ | B62D 25/087 |
| 2018/0037190 A1* | 2/2018 | Shahidi | ................. | B60R 5/044 |
| 2018/0170454 A1* | 6/2018 | Kato | ................. | B62D 25/087 |

FOREIGN PATENT DOCUMENTS

| | | |
|---|---|---|
| JP | 2007-307993 | 11/2007 |
| JP | 2008-195090 | 8/2008 |

\* cited by examiner

VEHICLE REAR STRUCTURE

INCORPORATION BY REFERENCE

The disclosure of Japanese Patent Application No. 2016-244467 filed on Dec. 16, 2016 including the specification, drawings and abstract is incorporated herein by reference in its entirety.

BACKGROUND

1. Technical Field

The present disclosure relates to a vehicle rear structure.

2. Description of Related Art

Japanese Unexamined Patent Application Publication No. 2008-195090 (JP 2008-195090 A) discloses a vehicle rear structure including a compartment partition panel that is disposed behind a rear seat in a vehicle forward-rearward direction and performs partitioning into a vehicle cabin and a luggage compartment in a vehicle forward-rearward direction, and an upper back panel that is coupled to the compartment partition panel and constitutes at least a portion of an upper wall of the luggage compartment in a vehicle upward-downward direction.

As illustrated in FIG. 9, a front end part of an upper back panel 210 in the vehicle forward-rearward direction is coupled to an upper end part of a compartment partition panel 200 in the vehicle upward-downward direction. A first closed sectional part 220 having a closed section structure is constituted of the upper end part of the compartment partition panel 200 in the vehicle upward-downward direction and the front end part of the upper back panel 210 in the vehicle forward-rearward direction. The first closed sectional part 220 extends in the vehicle width direction, and guarantees the torsional stiffness of a vehicle. Additionally, a coupling panel 230 is coupled to a rear end part of the upper back panel 210 in the vehicle forward-rearward direction. A second closed sectional part 240 having a closed section structure is constituted of the rear end part of the upper back panel 210 in the vehicle forward-rearward direction and the coupling panel 230. The second closed sectional part 240 extends in the vehicle width direction, and supports a back windshield 250 that is disposed above the upper back panel 210 in the vehicle upward-downward direction.

SUMMARY

In order to enhance the steering stability of the vehicle, it is desirable to enhance the torsional stiffness of the vehicle. In the vehicle rear structure described in JP 2008-195090 A, the torsional stiffness of the vehicle can be further enhanced by making the thickness of the first closed sectional part 220 larger than usual. However, since a portion of the upper back panel 210 constitutes the first closed sectional part 220, when the thickness of the first closed sectional part 220 is made larger than usual, the thickness of the overall upper back panel 210 becomes larger, and the weight of vehicle also increases.

Additionally, since the shape of the rear end part of the upper back panel 210 in the vehicle forward-rearward direction is influenced by the design of the vehicle, the shape of the upper back panel 210 is set in conformity with the design of each type of vehicle. From a relationship in which the upper back panel 210 constitutes the first closed sectional part 220, the torsional stiffness of the first closed sectional part 220 is evaluated on the upper back panel 210. For that reason, there is a need for performing an evaluation test of the torsional stiffness of the first closed sectional part 220 for each type of vehicle in which the shape of the upper back panel 210 is different, and the quality control of the vehicle becomes complicated.

An aspect of the present disclosure relates to a vehicle rear structure having an upper back panel, and a closed sectional part that is coupled to a front end part of the upper back panel in a vehicle forward-rearward direction and has a closed section structure. The closed sectional part is constituted of a first panel and a second panel that are panel members different from the upper back panel, and the thickness of the first panel and the thickness of the second panel are larger than the thickness of the upper back panel, respectively.

According to the aspect of the present disclosure, the thickness of the closed sectional part, which is coupled to the front end part of the upper back panel in the vehicle forward-rearward direction and is constituted by the panel members different from the upper back panel, is made larger than the thickness of the upper back panel. For that reason, by making the thicknesses of the first panel and the second panel that directly relate to the torsional stiffness of the closed sectional part larger, an increase in the weight of the upper back panel can be further suppressed while optimizing the torsional stiffness of the closed sectional part. Additionally, since it is possible to independently design the closed sectional part and the upper back panel, the closed sectional part can be made common for each type of vehicle, and the need for evaluating the torsional stiffness of the first closed sectional part for each type of vehicle is eliminated. For that reason, a burden on the quality control of vehicles can be reduced more than that in the related art. In this way, according to the aspect of the present disclosure, an improvement in the torsional stiffness and suppression of an increase in the weight in the vehicle rear structure can be made compatible with each other, and a burden on the quality control of the vehicle can also be reduced.

In the vehicle rear structure according to the aspect of the present disclosure, the first panel may include an upper wall part that extends in the vehicle forward-rearward direction, and a front wall part that extends downward in a vehicle upward-downward direction from a front end of the upper wall part in the vehicle forward-rearward direction. The second panel may include a lower wall part that is disposed below the upper wall part in the vehicle upward-downward direction and extends in the vehicle forward-rearward direction, and a rear wall part that extends upward in the vehicle upward-downward direction from a rear end of the lower wall part in the vehicle forward-rearward direction. A closed section of the closed sectional part may be constituted of the upper wall part, the front wall part, the lower wall part, and the rear wall part, and the thickness of the first panel may be larger than the thickness of the second panel.

According to the aspect of the present disclosure, the thickness of the first panel is larger than the thickness of the second panel. The inventors have found out that, in a case where the closed section is constituted of the upper wall part and the front wall part of the first panel and the lower wall part and the rear wall part of the second panel, the thickness of the first panel contributes more to the torsional stiffness of the vehicle rear structure than the thickness of the second panel. According to the aspect of the present disclosure, the torsional stiffness of the vehicle rear structure can be more efficiently improved by making the thickness of the portion of the closed sectional part that greatly contributes to the torsional stiffness of the vehicle rear structure larger.

In the vehicle rear structure according to the aspect of the present disclosure, at least one of the first panel and the second panel may include a protruding strip that extends in a vehicle width direction. According to the aspect of the present disclosure, at least one of the first panel and the second panel that constitutes the closed section may include the protruding strip that extends in the vehicle width direction. For that reason, the bending stiffness of at least one of the first panel and the second panel in the vehicle forward-rearward direction becomes higher, which can also contribute to an improvement in the bending stiffness in addition to the torsional stiffness of the vehicle rear structure.

In the aspect of the present disclosure, the upper back panel may constitute a portion, on a front side in the vehicle forward-rearward direction, of an upper wall of a luggage compartment in the vehicle upward-downward direction, which is provided at a vehicle rear part.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

One embodiment of a vehicle rear structure will be described with reference to FIGS. 1 to 4. In the respective drawings, the front in a vehicle forward-rearward direction is indicated by arrow direction "Fr", the rear in the vehicle forward-rearward direction is indicated by arrow direction "Rr", the right-hand side in the vehicle width direction toward the front in the vehicle forward-rearward direction is indicated by arrow direction "RH", the left-hand side in the vehicle width direction toward the front in the vehicle forward-rearward direction is indicated by arrow direction "LH", and the upper side in a vehicle upward-downward direction is indicated by arrow direction "Upr".

Figure 1:
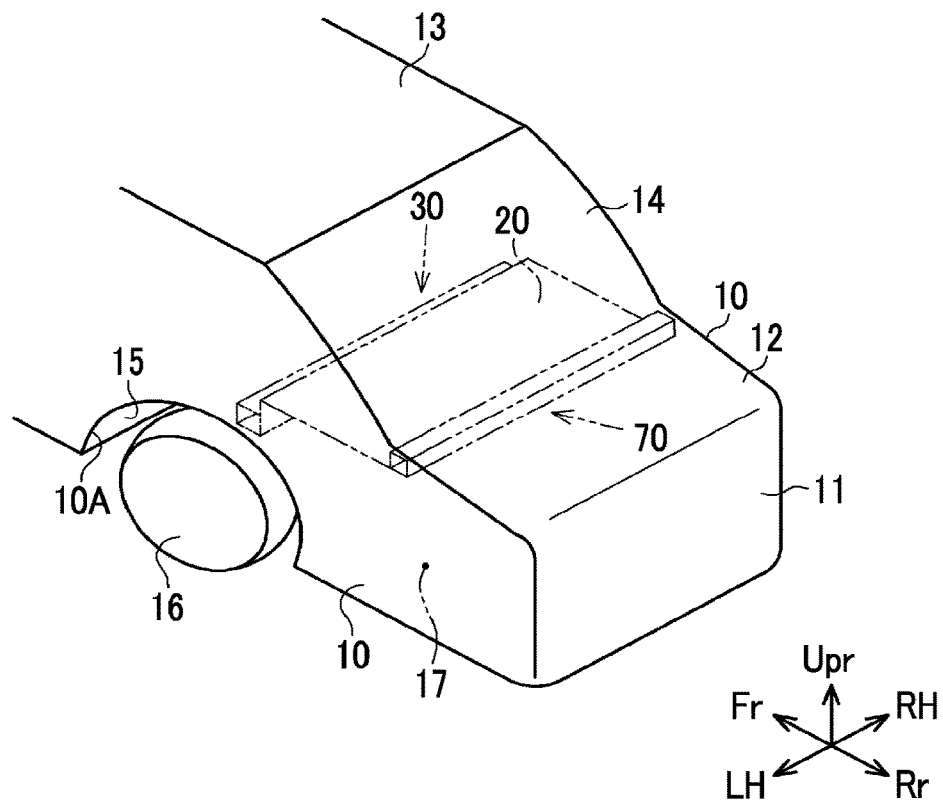
FIG. 1 is a perspective view of a vehicle schematically illustrating the configuration of a vehicle rear part.

As illustrated in FIG. 1, a pair of rear fenders 10 is disposed at a vehicle rear part, and the rear fenders 10 are disposed at both end parts in the vehicle width direction. The rear fenders 10 are coupled together by a rear bumper 11, a trunk panel 12, a roof 13, and the like that extend in the vehicle width direction. A back windshield 14 is disposed between the roof 13 and the trunk panel 12. Each rear fender 10 is formed with a substantially semicircular cutout part 10A that is cut out from a lower end part thereof in the vehicle upward-downward direction.

A wheel housing 15 is coupled to the cutout part 10A of the rear fender 10 from the inside in the vehicle width direction. A rear tire 16 is accommodated in the wheel housing 15. The wheel housing 15 has a shape that is curved along an outer peripheral surface of the rear tire 16.

The vehicle is provided with an upper back panel 20 that is one constituent member of the vehicle rear structure. The upper back panel 20 constitutes a portion of a front side, in the vehicle forward-rearward direction, of an upper wall, in the vehicle upward-downward direction, of a luggage compartment 17 provided at the vehicle rear part. The upper back panel 20 is made of an elongated plate material that extends in the vehicle width direction.

Figure 2:
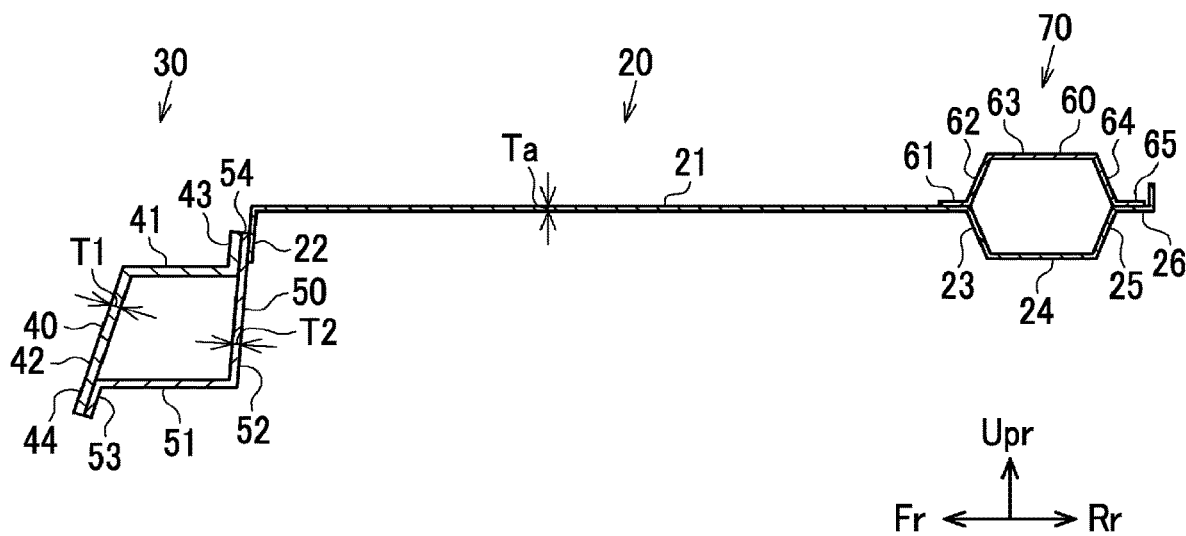
FIG. 2 is a sectional view illustrating the structure of an upper back panel, a first panel, a second panel, and a coupling panel.

As illustrated in FIG. 2, the upper back panel 20 has a main body part 21, and a first bent part 22 that is bent downward in the vehicle upward-downward direction from a front end of the main body part 21 in the vehicle forward-rearward direction. Additionally, the upper back panel 20 has a second bent part 23 that is coupled to a rear end of the main body part 21 in the vehicle forward-rearward direction and extends downward in the vehicle upward-downward direction. The second bent part 23 is inclined so as to be located on a lower side in the vehicle upward-downward direction as the second bent part is separated from the main body part 21. A third bent part 24 that horizontally extends rearward in the vehicle forward-rearward direction is coupled to a lower end of the second bent part 23 in the vehicle upward-downward direction. A fourth bent part 25 is coupled to a rear end of the third bent part 24 in the vehicle forward-rearward direction. The fourth bent part 25 extends rearward in the vehicle forward-rearward direction, and is inclined so as to be located on an upper side in the vehicle upward-downward direction as the fourth bent part is separated from the third bent part 24. An upper end of the second bent part 23 in the vehicle upward-downward direction and an upper end of the fourth bent part 25 in the vehicle upward-downward direction are at the same position in the vehicle upward-downward direction. A fifth bent part 26 that horizontally extends rearward in the vehicle forward-rearward direction is coupled to the upper end of the fourth bent part 25 in the vehicle upward-downward direction. A rear end part of the fifth bent part 26 in the vehicle forward-rearward direction is bent upward in the vehicle upward-downward direction.

The first bent part 22 of the upper back panel 20 constitutes a front end part of the upper back panel 20 in the vehicle forward-rearward direction. A first closed sectional part 30 having a closed section structure is coupled to the first bent part 22. The first closed sectional part 30 is one constituent member of the vehicle rear structure, and is composed of a first panel 40 and a second panel 50 that are panel members different from the upper back panel 20. The first panel 40 is disposed in front of the second panel 50 in the vehicle forward-rearward direction. The first panel 40 has an upper wall part 41 that extends in the vehicle forward-rearward direction, a front wall part 42 that extends downward in the vehicle upward-downward direction from a front end of the upper wall part 41 in the vehicle forward-rearward direction, and a first abutment part 43 that extends upward in the vehicle upward-downward direction from a rear end of the upper wall part 41 in the vehicle forward-rearward direction. The front wall part 42 is inclined so as to be located closer to a front side in the vehicle forward-rearward direction as the front wall part is closer to a vehicle lower side. The second panel 50 has a lower wall part 51 that is disposed below the upper wall part 41 in the vehicle upward-downward direction and extends in the vehicle forward-rearward direction, a rear wall part 52 that extends upward in the vehicle upward-downward direction from a rear end of the lower wall part 51 in the vehicle forward-rearward direction, and an inside flange part 53 that extends downward in the vehicle upward-downward direction from a front end of the lower wall part 51 in the vehicle forward-rearward direction.

An upper portion of the rear wall part 52 of the second panel 50 is overlapped with a front surface of the first bent part 22, and the first abutment part 43 of the first panel 40 is overlapped with a front surface of an upper portion of the rear wall part 52 of the second panel 50. In the following, a portion of the rear wall part 52 of the second panel 50 overlapped with the first bent part 22 is referred to as a second abutment part 54. That is, the second panel 50 has the second abutment part 54 that is overlapped with the first abutment part 43 of the first panel 40. Additionally, a lower portion of the front wall part 42 of the first panel 40 is overlapped with a front surface of the inside flange part 53 of the second panel 50. In the following, a portion of the front wall part 42 of the first panel 40 overlapped with the inside flange part 53 of the second panel 50 is referred to as an outside flange part 44.

Figure 3:
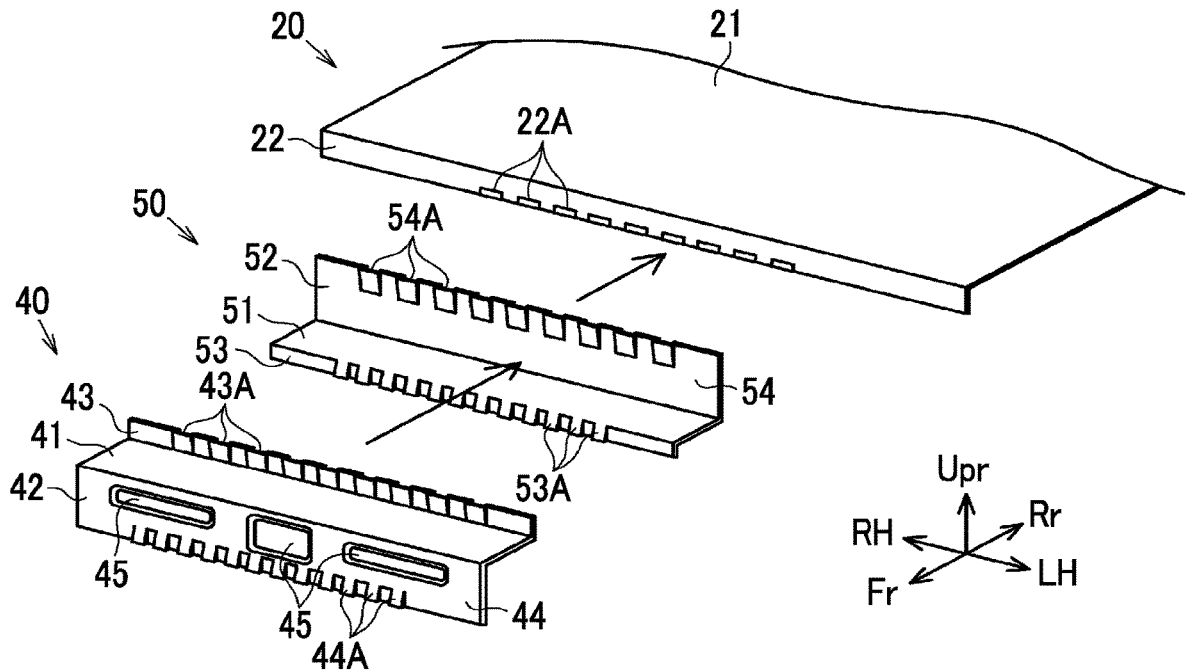
FIG. 3 is an exploded perspective view of the upper back panel, the first panel, and the second panel.

As illustrated in FIG. 3, a plurality of first protrusions 22A is formed at a central portion of the first bent part 22 of the upper back panel 20 in the vehicle width direction. The respective first protrusions 22A are disposed side by side in the vehicle width direction and protrude forward in the vehicle forward-rearward direction. The first protrusions 22A are formed by partially bending the first bent part 22, for example, through press working.

Additionally, first recesses 54A corresponding to the shape of the first protrusions 22A are formed at the rear wall part 52 of the second panel 50. The first recesses 54A are disposed by the same number as that of the first protrusions 22A side by side in the vehicle width direction at an upper end part of the rear wall part 52 in the vehicle upward-downward direction, that is, at the second abutment part 54. A plurality of second protrusions 53A is formed at a central portion of the inside flange part 53 of the second panel 50 in the vehicle width direction. The respective second protrusions 53A are disposed side by side in the vehicle width direction and protrude forward in the vehicle forward-rearward direction. The second abutment part 54 and the inside flange part 53 of the second panel 50 are formed in an uneven shape in the vehicle width direction by the first recesses 54A and the second protrusions 53A. The first recesses 54A or the second protrusions 53A are formed by partially bending the rear wall part 52 or the inside flange part 53 of the second panel 50, for example, through press working.

Second recesses 43A of a shape corresponding to the first recesses 54A are formed at the first abutment part 43 of the first panel 40. The second recesses 43A are disposed by the same number as that of the first recesses 54A side by side in the vehicle width direction at a central portion of the first abutment part 43 in the vehicle width direction. Additionally, a plurality of third recesses 44A of a shape corresponding to the second protrusions 53A is formed at the outside flange part 44 of the first panel 40. The third recesses 44A are disposed by the same number as that of the second protrusions 53A side by side in the vehicle width direction at a lower end part of the outside flange part 44 in the vehicle upward-downward direction. The first abutment part 43 and the outside flange part 44 of the first panel 40 are formed in an uneven shape in the vehicle width direction by the second recesses 43A and the third recesses 44A. The second recesses 43A or the third recesses 44A are formed by partially bending the first abutment part 43 or the outside flange part 44 of the first panel 40, for example, through press working.

Additionally, a plurality of protruding strips 45 is formed at the front wall part 42 of the first panel 40 such that each of the protruding strips 45 extends in the vehicle width direction and the protruding strips 45 are arranged side by side in the vehicle width direction. The respective protruding strips 45 are formed in a shape that protrudes rearward in the vehicle forward-rearward direction, that is, to the inside of the closed section structure.

As indicated by arrows illustrated in FIG. 3, the first abutment part 43 of the first panel 40 and the second abutment part 54 of the second panel 50 are overlapped with the first bent part 22. That is, as illustrated in FIG. 2, the first panel 40, the second panel 50, and the first bent part 22 are disposed in this order from the front side of the vehicle. In this state, the first recesses 54A of the second panel 50 are overlapped with the first protrusions 22A of the first bent part 22, and the second recesses 43A of the first panel 40 are overlapped with the first recesses 54A. Additionally, the outside flange part 44 of the first panel 40 is overlapped with the inside flange part 53 of the second panel 50. In this state, the third recesses 44A of the first panel 40 are overlapped with the second protrusions 53A of the second panel 50. In this way, the respective panels 20, 40, 50 are welded to each other in a state where the upper back panel 20, the first panel 40, and the second panel 50 are overlapped with each other. Also, the first panel 40 and the second panel 50 are welded together to form the first closed sectional part 30. That is, in the first closed sectional part 30, as illustrated in FIG. 2, a section in the vehicle forward-rearward direction is a closed section, and the closed section is constituted by the upper wall part 41, the front wall part 42, the lower wall part 51, and the rear wall part 52, and has a quadrangular shape.

As illustrated in FIG. 2, the thickness of the upper back panel 20 is substantially constant in the vehicle forward-rearward direction, and the thickness Ta is set to, for example, 0.55 mm. In the first panel 40, the thickness of the upper wall part 41, the front wall part 42, and the first abutment part 43 is substantially constant, and the thickness T1 is set to, for example, 1.0 mm. Additionally, in the second panel 50, the thickness of the lower wall part 51, the rear wall part 52, and the inside flange part 53 is substantially constant, and the thickness T2 is set to, for example, 0.8 mm. That is, the thickness T1 of the first panel 40 and the thickness T2 of the second panel 50 are larger than the thickness Ta of the upper back panel 20, and the thickness T1 of the first panel 40 is larger than the thickness T2 of the second panel 50 (T1>T2>Ta).

Additionally, as illustrated in FIG. 2, a coupling panel 60 is joined to a rear end part of the upper back panel 20 in the vehicle forward-rearward direction. The coupling panel 60 has a first coupling part 61 that abuts against a rear end part of the main body part 21 of the upper back panel 20 in the vehicle forward-rearward direction. A second coupling part 62 is coupled to a rear end of the first coupling part 61 in the vehicle forward-rearward direction. The second coupling part 62 is inclined so as to be located on the upper side in the vehicle upward-downward direction as the second coupling part is separated from the first coupling part 61. A third coupling part 63 that horizontally extends rearward in the vehicle forward-rearward direction is coupled to an upper end of the second coupling part 62 in the vehicle upward-downward direction. A fourth coupling part 64 is coupled to a rear end of the third coupling part 63 in the vehicle forward-rearward direction. The fourth coupling part 64 extends rearward in the vehicle forward-rearward direction, and is inclined so as to be located on the lower side in the vehicle upward-downward direction as the fourth coupling part is separated from the third coupling part 63. A lower end of the second coupling part 62 in the vehicle upward-downward direction and a lower end of the fourth coupling part 64 in the vehicle upward-downward direction are located at the same position in the vehicle upward-downward direction. A fifth coupling part 65 that horizontally extends rearward in the vehicle forward-rearward direction is coupled to the lower end of the fourth coupling part 64 in the vehicle upward-downward direction. The fifth coupling part 65 abuts against the fifth bent part 26. The coupling panel 60 is joined to the rear end part of the upper back panel 20 in the vehicle forward-rearward direction by welding the first coupling part 61 and the main body part 21 together and welding the fifth coupling part 65 and the fifth bent part 26 together. A second closed sectional part 70 is constituted by the rear end part of the upper back panel 20 in the vehicle forward-rearward direction and the coupling panel 60. In a second closed sectional part 70, a section in the vehicle forward-rearward direction is a closed section. The closed section of the second closed sectional part 70 is constituted by the second bent part 23, the third bent part 24, the fourth bent part 25, the second coupling part 62, the third coupling part 63, and the fourth coupling part 64, and has a hexagonal shape. In addition, the rear end part of the upper back panel 20 in the vehicle forward-rearward direction is constituted by the rear end part of the main body part 21 of the upper back panel 20 in the vehicle forward-rearward direction, the second bent part 23, the third bent part 24, the fourth bent part 25, and the fifth bent part 26.

Figure 4:
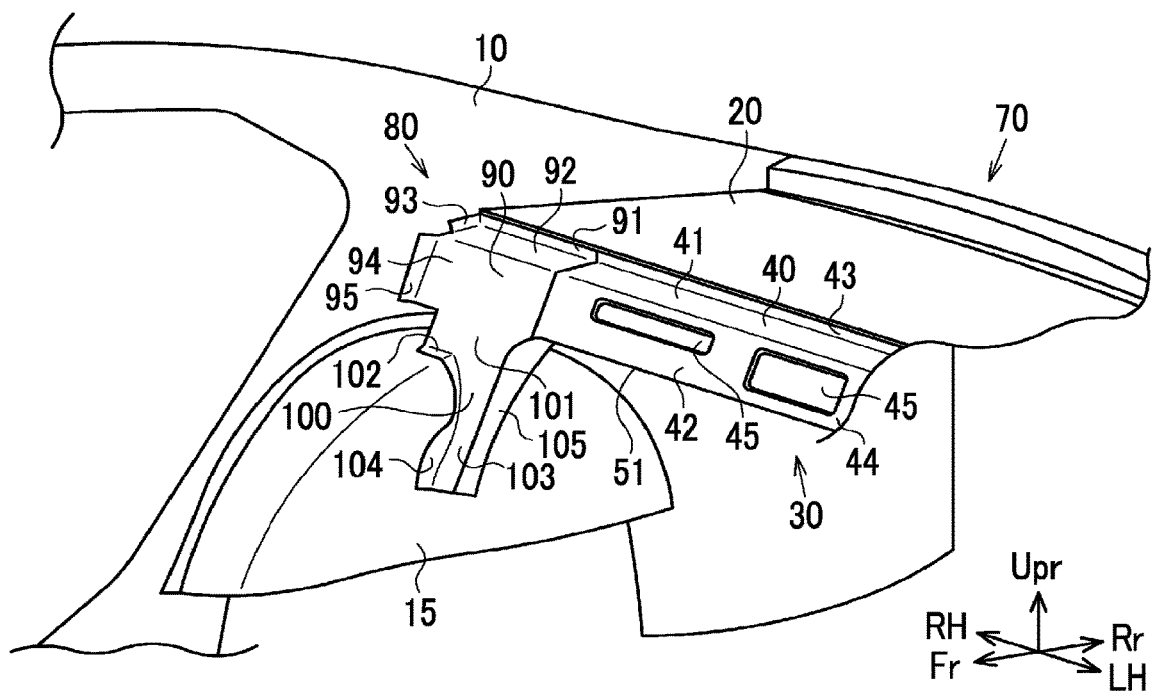
FIG. 4 is a perspective view schematically illustrating the configuration of the vehicle rear part.

As illustrated in FIG. 4, the first closed sectional part 30 and the second closed sectional part 70 extend in the vehicle width direction. Both end parts of the first closed sectional part 30 respectively extend to the vicinity of the wheel housing 15. A supporting member 80 is coupled to each of the end parts of the first closed sectional part 30. The supporting member 80 is composed of an upper supporting part 90 that couples the first closed sectional part 30 and the rear fender 10 together, and a lower supporting part 100 that extends downward in the vehicle upward-downward direction from the upper supporting part 90 and is coupled to the wheel housing 15. The upper supporting part 90 has a first flange 91 that is welded to the upper back panel 20. An upper supporting wall 92 that extends forward in the vehicle forward-rearward direction is coupled to a lower end of the first flange 91 in the vehicle upward-downward direction. A second flange 93 that is joined to the inside of the rear fender 10 in the vehicle width direction is coupled to an outside end part of the upper supporting wall 92 in the vehicle width direction. Additionally, a front supporting wall 94 that extends downward in the vehicle upward-downward direction is coupled to a front end of the upper supporting wall 92 in the vehicle forward-rearward direction. A third flange 95 that is joined to the inside of the rear fender 10 in the vehicle width direction is coupled to an outside end part of the front supporting wall 94 in the vehicle width direction. Inside end parts of the upper supporting wall 92 and the front supporting wall 94 in the vehicle width direction extend to the inside of the first closed sectional part 30. The upper supporting wall 92 abuts against a lower surface of the upper wall part 41 of the first closed sectional part 30 and is welded to the upper wall part 41, and the front supporting wall 94 abuts against a rear surface of the front wall part 42 of the first closed sectional part 30 and is welded to the front wall part 42. In addition, the upper supporting part 90 also has a rear upper supporting wall that is not illustrated. The rear upper supporting wall extends downward in the vehicle upward-downward direction from a lower end of the first flange 91 in the vehicle upward-downward direction, and an end part thereof on the inside in the vehicle width direction abuts against a front surface of the rear wall part 52 of the first closed sectional part 30 and is welded to the rear wall part 52.

The lower supporting part 100 has a middle supporting wall 101 that extends from a lower end of the front supporting wall 94 of the upper supporting part 90 in the vehicle upward-downward direction to an upper end of the wheel housing 15 in the vehicle upward-downward direction. A fourth flange 102 that is joined to an upper wall of the wheel housing 15 is coupled to a lower end of the middle supporting wall 101 in the vehicle upward-downward direction on the outside in the vehicle width direction. Additionally, a lower supporting wall 103 that is disposed inside the wheel housing 15 in the vehicle width direction is coupled to a lower end of the middle supporting wall 101 in the vehicle upward-downward direction on the inside in the vehicle width direction. A fifth flange 104 that is joined to a side wall of the wheel housing 15 is coupled to an outside end part of the lower supporting wall 103 in the vehicle width direction. The lower supporting part 100 also has a side supporting wall 105 that extends rearward in the vehicle forward-rearward direction from inside end parts of the middle supporting wall 101 and the lower supporting wall 103 in the vehicle width direction. An upper end of the side supporting wall 105 in the vehicle upward-downward direction is welded to the lower wall part 51 of the first closed sectional part 30. In addition, the lower supporting part 100 also has a rear lower supporting wall that is not illustrated. The rear lower supporting wall extends downward in the vehicle upward-downward direction from a lower end of the above-described rear upper supporting wall (not illustrated) in the vehicle upward-downward direction, and extends along the wheel housing 15 so as to face the middle supporting wall 101 and the lower supporting wall 103. The rear lower supporting wall has the side supporting wall 105 coupled to an inside end part thereof in the vehicle width direction, and an outside end part thereof in the vehicle width direction is coupled to the side wall of the wheel housing 15.

As illustrated in FIG. 4, both end parts of the second closed sectional part 70 extend to the rear fender 10 and are welded to the inside of the rear fender 10 in the vehicle width direction. As illustrated in FIG. 1, the second closed sectional part 70 is disposed below, in the vehicle upward-downward direction, a rear end part of the back windshield 14 in the vehicle forward-rearward direction, and supports the back windshield 14.

The working effects of the present embodiment will be described. (1) In the present embodiment, the first closed sectional part 30 constituted of the first panel 40 and the second panel 50 that are panel members that are different from the upper back panel 20 is coupled to the front end part of the upper back panel 20 in the vehicle forward-rearward direction. Also, the thickness T1 of the first panel 40 and the thickness T2 of the second panel 50 are made larger than the thickness Ta of the upper back panel 20. In this way, the first closed sectional part 30 is constituted of a member that is different from the upper back panel 20, and the thickness T1 of the first panel 40 and the thickness T2 of the second panel 50 that directly relate to the torsional stiffness of the first closed sectional part 30 are made larger. Accordingly, an increase in the weight of the upper back panel 20 can be further suppressed while optimizing the torsional stiffness of the first closed sectional part 30.

Additionally, since it is possible to independently design the first closed sectional part 30 and the upper back panel 20, the first closed sectional part 30 can be made common for each type of vehicle, and the need for evaluating the torsional stiffness of the first closed sectional part 30 for each type of vehicle is eliminated. For that reason, a burden on the quality control of vehicles can be reduced more than in the related art.

Hence, an improvement in the torsional stiffness and suppression of an increase in the weight in the vehicle rear structure can be made compatible with each other, and a burden on the quality control of the vehicle can also be reduced. (2) The thickness T1 of the first panel 40 is made larger than the thickness T2 of the second panel 50. The inventors have found out that, in a case where the closed section is constituted of the upper wall part 41 and the front wall part 42 of the first panel 40 and the lower wall part 51 and the rear wall part 52 of the second panel 50, the thickness T1 of the first panel 40 contributes more to the torsional stiffness of the vehicle rear structure than the thickness T2 of the second panel 50. According to the present embodiment, in the first closed sectional part 30 in which the closed section is constituted of the upper wall part 41 and the front wall part 42 of the first panel 40 and the lower wall part 51 and the rear wall part 52 of the second panel 50, the thickness T1 of the first panel 40 that is a portion that greatly contributes to the torsional stiffness of the vehicle rear structure is made larger. For that reason, the torsional stiffness of the vehicle rear structure can be more efficiently improved.

(3) In the present embodiment, the upper back panel 20, the first panel 40, and the second panel 50 are welded together in a state where the first panel 40 and the second panel 50 are overlapped with the first bent part 22 of the upper back panel 20. For that reason, the upper back panel 20, the first panel 40, and the second panel 50 can be welded in common. Hence, although the number of members increases because the upper back panel 20 does not constitute the first closed sectional part 30, an increase in the number of manufacturing steps can be further suppressed in terms of welding and fixing of each of the upper back panel 20, the first panel 40, and the second panel 50.

(4) The protruding strips 45 that extend in the vehicle width direction are formed at the front wall part 42 of the first panel 40. For that reason, the bending stiffness of the first panel 40 in the vehicle forward-rearward direction becomes higher, which can contribute also to an improvement in the bending stiffness in addition to the torsional stiffness of the vehicle rear structure. Additionally, by providing the protruding strips 45, the surface stiffness of the front wall part 42 is increased.

(5) The first recesses 54A are formed side by side in the vehicle width direction at the second abutment part 54 of the second panel 50, and the second abutment part 54 is formed in the uneven shape in the vehicle width direction. Additionally, the second recesses 43A are formed side by side in the vehicle width direction at the first abutment part 43 of the first panel 40, and the first abutment part 43 is formed in the uneven shape in the vehicle width direction. The second recesses 43A are formed in the shape corresponding to the first recesses 54A provided at the second abutment part 54.

Hence, when the first abutment part 43 of the first panel 40 and the second abutment part 54 of the second panel 50 are overlapped with each other, a positional deviation in the vehicle width direction is not relatively easily caused because irregularities are locked to each other. Hence, the workability when welding the first abutment part 43 of the first panel 40 and the second abutment part 54 of the second panel 50 together can be further improved. Additionally, occurrence of abnormal noise due to rubbing between the first abutment part 43 of the first panel 40 and the second abutment part 54 of the second panel 50 can also be further suppressed.

(6) The first protrusions 22A arranged at the central portion in the vehicle width direction are formed at the first bent part 22 of an upper back panel 20, and the first bent part 22 is formed in the uneven shape in the vehicle width direction. Additionally, the first recesses 54A formed at the second abutment part 54 and the second recesses 43A formed at the first abutment part 43 are formed in the shape corresponding to the shape of the first protrusions 22A. For that reason, when the first abutment part 43 and the second abutment part 54 overlap the first bent part 22, irregularities of the respective panels 20, 40, and 50 are locked to each other, and a positional deviation of the first panel 40 and the second panel 50 in the vehicle width direction with respect to the upper back panel 20 is also not relatively easily caused. Hence, the workability when welding the first abutment part 43 and the second abutment part 54 to the first bent part 22 can be further improved. Additionally, occurrence of abnormal noise due to rubbing between the first bent part 22 and the first abutment part 43 can also be further suppressed.

(7) The second protrusions 53A are formed side by side in the vehicle width direction at the inside flange part 53 of the second panel 50, and the inside flange part 53 is formed in the uneven shape in the vehicle width direction. Additionally, the third recesses 44A are formed side by side in the vehicle width direction at the outside flange part 44 of the first panel 40. For that reason, the inside flange part 53 is formed in the uneven shape in the vehicle width direction. The third recesses 44A are formed in the shape corresponding to the second protrusions 53A provided at the inside flange part 53. Hence, when the outside flange part 44 of the first panel 40 and the inside flange part 53 of the second panel 50 are overlapped with each other, a positional deviation in the vehicle width direction is not relatively easily caused because irregularities are locked to each other. Hence, the workability when welding the outside flange part 44 of the first panel 40 and the inside flange part 53 of the second panel 50 together can be further improved. Additionally, occurrence of abnormal noise due to rubbing between the outside flange part 44 of the first panel 40 and the inside flange part 53 of the second panel 50 can also be further suppressed.

The embodiment can be changed and executed as follows.

The second protrusions 53A formed at the inside flange part 53 of the second panel 50 may be formed in the vehicle upward-downward direction, and the inside flange part 53 may be formed in an uneven shape in the vehicle upward-downward direction. In this case, it is desirable that the third recesses 44A formed at the outside flange part 44 of the first panel 40 are formed in the vehicle upward-downward direction and the outside flange part 44 is formed in an uneven shape in the vehicle upward-downward direction. According to the above-described configuration, when the outside flange part 44 of the first panel 40 and the inside flange part 53 of the second panel 50 are overlapped with each other, a positional deviation in the vehicle upward-downward direction is not relatively easily caused.

Although the second protrusions 53A may be formed at the inside flange part 53 of the second panel 50, a single second protrusion 53A may be formed, or the second protrusions 53A may be omitted. Additionally, although the third recesses 44A are formed at the outside flange part 44 of the first panel 40, a single third recesses 44A may be formed, or the third recesses 44A may be omitted.

The first protrusions 22A formed at the first bent part 22 of the upper back panel 20 may be formed in the vehicle upward-downward direction, and the first bent part 22 may be formed in an uneven shape in the vehicle upward-downward direction. In this case, it is desirable that the second recesses 43A formed at the first abutment part 43 of the first panel 40 are formed in the vehicle upward-downward direction and the first abutment part 43 is formed in an uneven shape in the vehicle upward-downward direction. Additionally, it is desirable that the first recesses 54A formed at the second abutment part 54 of the second panel 50 are formed in the vehicle upward-downward direction and the second abutment part 54 is formed in an uneven shape in the vehicle upward-downward direction. According to the above-described configuration, when the first abutment part 43 and the second abutment part 54 are overlapped with the first bent part 22, a positional deviation of the first panel 40 and the second panel 50 in the vehicle upward-downward direction with respect to the upper back panel 20 is not relatively easily caused.

Although the first protrusions 22A are formed at the first bent part 22 of the upper back panel 20, a single first protrusion 22A may be formed, or the first protrusions 22A may be omitted. Although the first recesses 54A are formed in the second abutment part 54 of the second panel 50, a single first recess 54A may be formed, or the first recesses 54A may be omitted. Additionally, although the second recesses 43A are formed at the first abutment part 43 of the first panel 40, a single second recess 43A may be formed, or the second recesses 43A may be omitted.

The configuration of the protruding strips 45 formed at the first panel 40 is not limited to an above-described configuration. For example, the front wall part 42 may have a shape that protrudes forward in the vehicle forward-rearward direction. Additionally, the protruding strips 45 may be formed at the upper wall part 41 or the first abutment part 43 instead of or in addition to the front wall part 42. Moreover, the protruding strips 45 may not be provided, and a single protruding strip may be provided. Additionally, it is also possible to form the protruding strips 45 at at least one of the lower wall part 51, the rear wall part 52, and the inside flange parts 53 of the second panel 50 instead of the first panel 40. Moreover, the protruding strips 45 may be formed on both the first panel 40 and the second panel 50. Additionally, it is also possible to omit the protruding strips 45.

Although an example in which the upper back panel 20, the first panel 40, and the second panel 50 are welded in common has been illustrated, the upper back panel 20, the first panel 40, and the second panel 50 may be separately welded. For example, the first panel 40 and the second panel 50 may be welded to the upper back panel 20 after the first panel 40 and the second panel 50 are welded together. Additionally, the first panel 40 may be welded to the second panel 50 and the upper back panel 20 after the second panel 50 and the upper back panel 20 are welded together.

Figure 5:
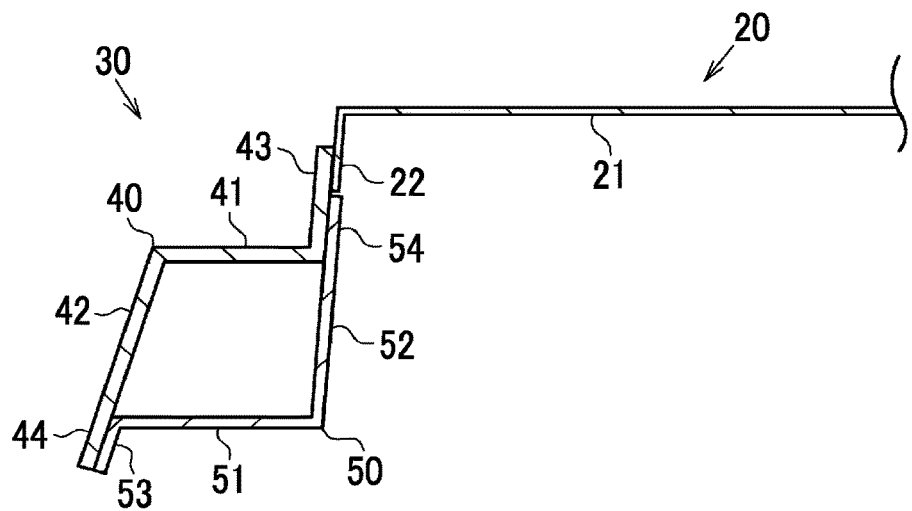
FIG. 5 is a sectional view illustrating a modification example of the vehicle rear structure.

An aspect of welding between the upper back panel 20, and the first panel 40 and the second panel 50 is not limited to the above-described aspect. That is, either the first panel 40 or the second panel 50 may be welded to the upper back panel 20. For example, as illustrated in FIG. 5, the respective panels 20, 40, 50 may be welded together by overlapping an upper end part of the first abutment part 43 of the first panel 40 in the vehicle upward-downward direction with the front surface of the first bent part 22 of the upper back panel 20 and by overlapping the second abutment part 54 of the second panel 50 with a rear surface of a lower end part of the first abutment part 43 of the first panel 40 in the vehicle upward-downward direction. In the above-described configuration, the first panel 40 and the upper back panel 20 are welded together, and the second panel 50 is welded solely to the first panel 40, not welded to the upper back panel 20. Even in such a configuration, it is possible to couple the first closed sectional part 30 to the front end part of the upper back panel 20 in the vehicle forward-rearward direction. In addition, the second panel 50 may be welded to the upper back panel 20, and the first panel 40 may be welded solely to the second panel 50, not welded to the upper back panel 20.

Figure 6:
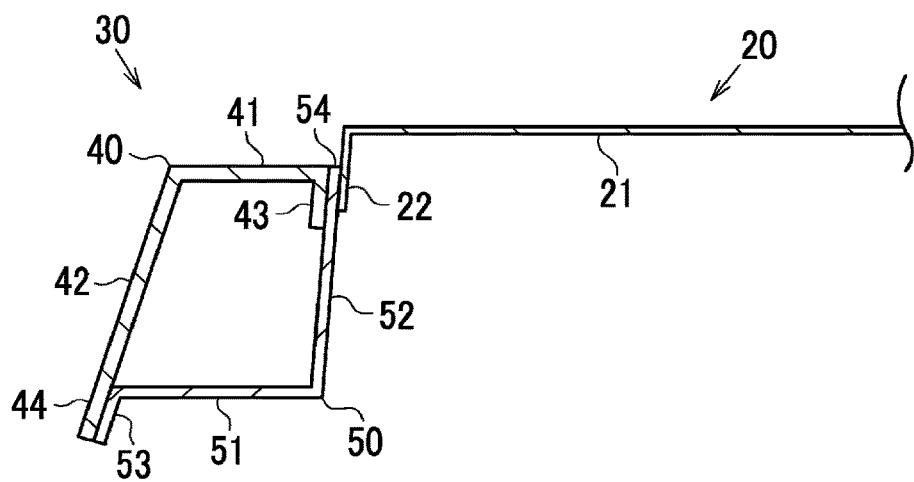
FIG. 6 is a sectional view illustrating a modification example of the vehicle rear structure.
Figure 7:
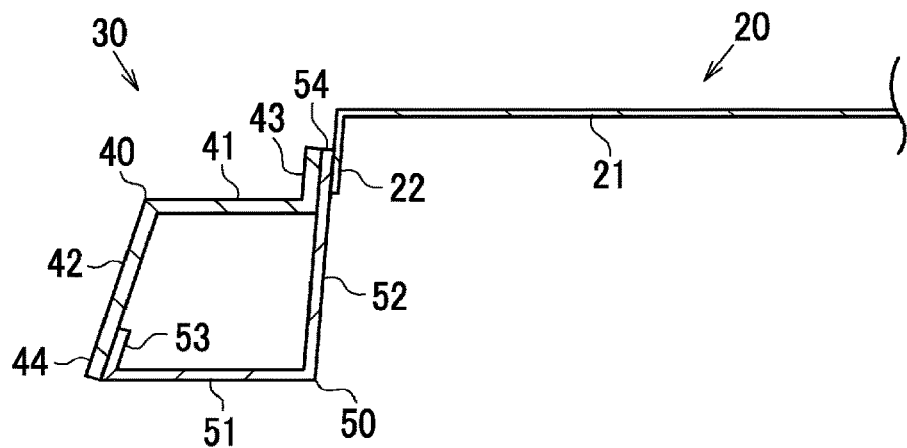
FIG. 7 is a sectional view illustrating a modification example of the vehicle rear structure.

The shapes of the first panel 40 and the second panel 50 are not limited to those of the embodiment. For example, as illustrated in FIG. 6, the first abutment part 43 of the first panel 40 may be configured so as to extend downward in the vehicle upward-downward direction from the rear end of the upper wall part 41 in the vehicle forward-rearward direction. Additionally, as illustrated in FIG. 7, the inside flange part 53 of the second panel 50 may be configured so as to extend upward in the vehicle upward-downward direction from the front end of the lower wall part 51 in the vehicle forward-rearward direction. In addition, it is also possible to adopt the configurations illustrated in FIGS. 6 and 7 in combination. Moreover, although the front wall part 42 is coupled to the front end of the upper wall part 41 of the first panel 40 in the vehicle forward-rearward direction, the front wall part 42 may be coupled to a portion closer to a vehicle rear side than the front end of the upper wall part 41 of the first panel 40 in the vehicle forward-rearward direction. Although the rear wall part 52 is coupled to the rear end of the lower wall part 51 of the second panel 50 in the vehicle forward-rearward direction, the rear wall part 52 may be coupled to a portion closer to a vehicle front side than the front end of the lower wall part 51 of the second panel 50 in the vehicle forward-rearward direction.

The thickness T1 of the first panel 40 is made larger than the thickness T2 of the second panel 50. Instead of such a configuration, the thickness T1 of the first panel 40 may be made equal to the thickness T2 of the second panel 50 (T1=T2), or may be made smaller than the thickness T2 of the second panel 50 (T1<T2). Even in this case, the thickness T1 of the first panel 40 and the thickness T2 of the second panel 50 are made larger than the thickness Ta of the upper back panel 20, respectively (T1, T2>Ta).

The closed section shape of the first closed sectional part 30 is not limited to the quadrangular shape. For example, other polygonal shapes, such as a hexagonal shape and an octagonal shape, may be adopted, or a circular shape may be adopted. The closed section shape of the second closed sectional part 70 is not limited to the hexagonal shape. For example, other polygonal shapes, such as a quadrangular shape and an octagonal shape, may be adopted, or a circular shape may be adopted.

Although the first bent part 22 is provided at the upper back panel 20, it is also possible to omit the first bent part 22. In this case, the front end part of the upper back panel 20 in the vehicle forward-rearward direction can be constituted of a front end part of the main body part 21 in the vehicle forward-rearward direction. In such a configuration, for example, a configuration as illustrated in FIG. 8 can be adopted.

Figure 8:
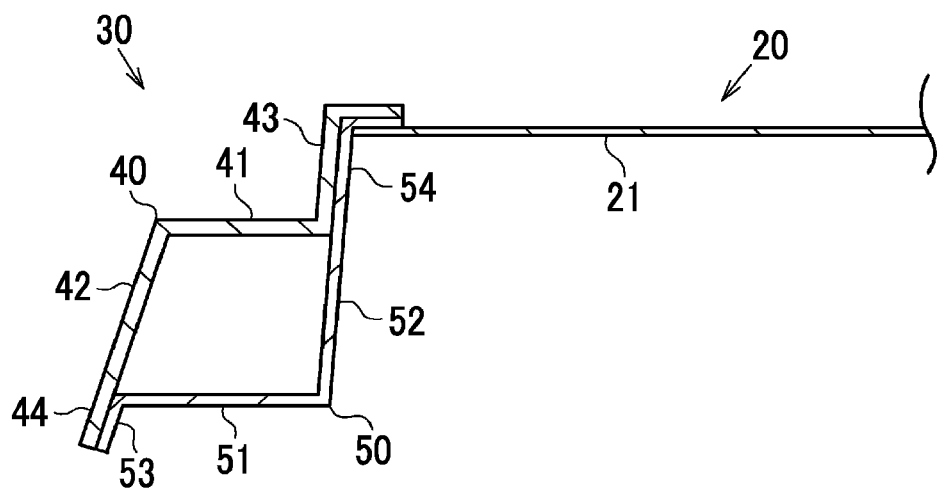
FIG. 8 is a sectional view illustrating a modification example of the vehicle rear structure.
Figure 9:
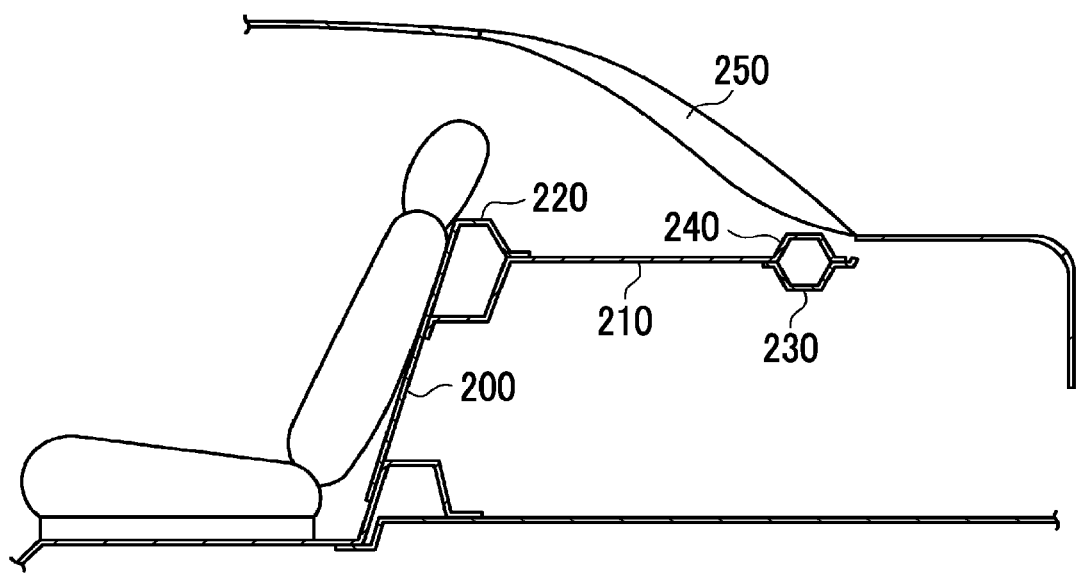
FIG. 9 is a sectional view illustrating a vehicle rear structure of the related art.

That is, as illustrated in FIG. 8, the first closed sectional part 30 is coupled to the main body part 21 of the upper back panel 20. The first closed sectional part 30 has a shape in which the upper end part of the first abutment part 43 of the first panel 40 in the vehicle upward-downward direction and the upper end part of the second abutment part 54 of the second panel 50 in the vehicle upward-downward direction may be bent rearward in the vehicle forward-rearward direction. The bent portion of the second abutment part 54 is placed on and overlapped with the upper surface of the main body part 21. The bent portion of the first abutment part 43 is placed on and overlapped with an upper surface of the bent portion of the second abutment part 54. In this way, by welding the respective panels 20, 40, 50 to each other in a state where the upper back panel 20, the first panel 40, and the second panel 50 are overlapped with each other, it is possible to couple the first closed sectional part 30 to the front end part of the upper back panel 20 in the vehicle forward-rearward direction.

A compartment partition panel may be constituted of the first panel 40 by extending a lower end part of the front wall part 42 of the first panel 40 in the vehicle upward-downward direction downward in the vehicle upward-downward direction up to the floor panel of the vehicle. Additionally, the compartment partition panel may be constituted of the second panel 50 by extending a lower end part of the inside flange part 53 of the second panel 50 in the vehicle upward-downward direction downward in the vehicle upward-downward direction up to the floor panel of the vehicle. Moreover, the compartment partition panel may be constituted of both the front wall part 42 of the first panel 40 and the inside flange part 53 of the second panel 50. Additionally, the compartment partition panel may be constituted of a plate material that is different from the first panel 40 and the second panel 50, or the compartment partition panel may be joined to at least one of the first panel 40 and the second panel 50.

The supporting member 80 may be omitted. In this case, the first closed sectional part 30 may be disposed to extend until the first closed sectional part abuts against the rear fender 10 and may be welded to the rear fender 10, or the first closed sectional part 30 may be welded to the wheel housing 15 so as to abut against the wheel housing 15.

What is claimed is:

1. A vehicle rear structure comprising:
   an upper back panel; and
   a closed sectional part that is coupled to a front end part of the upper back panel in a vehicle forward-rearward direction and has a closed section structure, wherein:
   the closed sectional part is constituted of a first panel and a second panel that are panel members different from the upper back panel;
   a thickness of the first panel and a thickness of the second panel are larger than a thickness of the upper back panel, respectively; and
   both a back end part of the first panel and a back end part of the second panel overlap a top surface of the upper back panel.

2. The vehicle rear structure according to claim 1, wherein:
   the first panel includes an upper wall part that extends in the vehicle forward-rearward direction, and a front wall part that extends downward in the vehicle upward-downward direction from a front end of the upper wall part in the vehicle forward-rearward direction;
   the second panel includes a lower wall part that is disposed below the upper wall part in the vehicle upward-downward direction and extends in the vehicle forward-rearward direction, and a rear wall part that extends upward in the vehicle upward-downward direction from a rear end of the lower wall part in the vehicle forward-rearward direction;
   a closed section of the closed sectional part is constituted of the upper wall part, the front wall part, the lower wall part, and the rear wall part; and
   the thickness of the first panel is larger than the thickness of the second panel.

3. The vehicle rear structure according to claim 1, wherein at least one of the first panel and the second panel includes a protruding strip that extends in a vehicle width direction.

4. The vehicle rear structure according to claim 1, wherein the upper back panel constitutes a portion, on a front side in the vehicle forward-rearward direction, of an upper wall of a luggage compartment in a upward-downward direction of the vehicle, which is provided at a vehicle rear part.

* * * * *